UNITED STATES PATENT OFFICE.

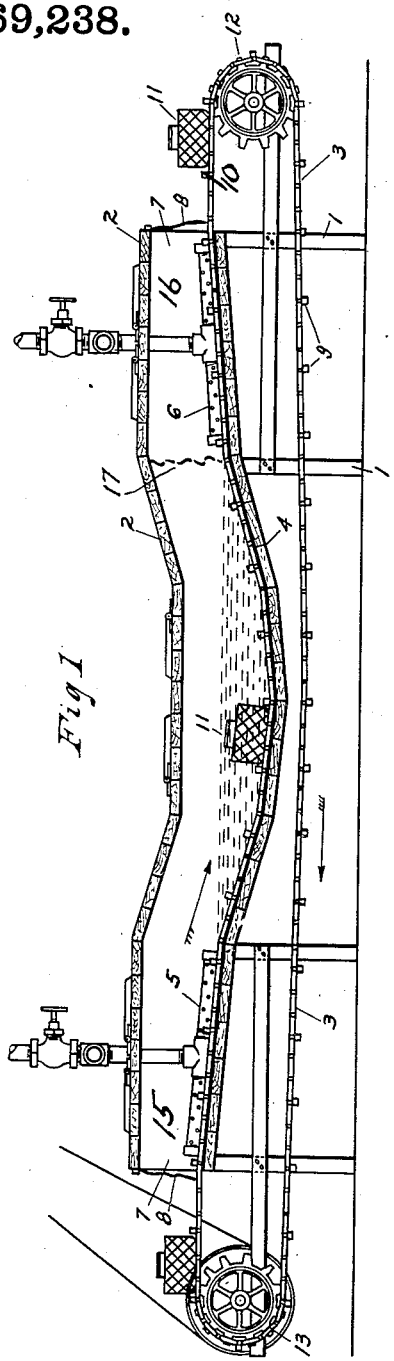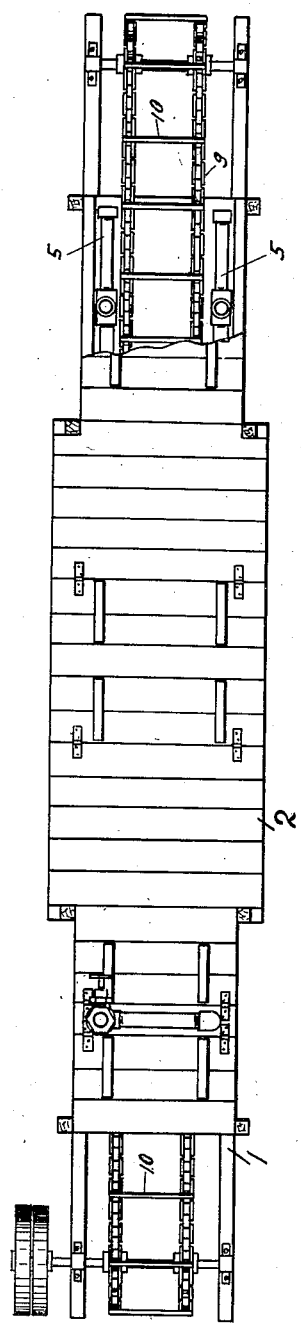

GEORGE E. WRIGHT, OF ABERDEEN, MARYLAND.

PROCESS OF SCALDING AND WASHING VEGETABLES.

969,238.  Specification of Letters Patent.  Patented Sept. 6, 1910.

Application filed November 18, 1909. Serial No. 528,772.

*To all whom it may concern:*

Be it known that I, GEORGE E. WRIGHT, a citizen of the United States of America, residing at the town of Aberdeen, in the county of Harford and State of Maryland, have invented certain new and useful Improvements in Processes of Scalding and Washing Vegetables, of which the following is a specification.

This invention relates to a process for scalding and washing tomatoes and other vegetables preparatory to canning. Its object is the improvement of such process whereby the product is more quickly and perfectly cleaned, more evenly scalded, with less damage to the product, and is treated with little contact with the hands of the operator.

My process consists in first subjecting the vegetables to the action of steam, then immersing them in water and finally subjecting them to the action of a drying fluid. In the most successful operation of my process the steam to which the vegetables are first subjected is live steam, the water in which they are immersed is hot and the final treatment is by superheated steam or hot water. Preferably the vegetables are inclosed in foraminous receptacles when picked and are transported in these receptacles to the factory, the receptacles being placed on a mechanical conveyer which brings them with the contained vegetables into operative relation with the various steaming, washing and drying agencies in proper sequence to perform my process.

An apparatus by means of which my process may be carried out consists of a steam box to one or both ends of which steam, or other heating medium, is supplied by any suitable means, as perforated pipes, steam nozzles, etc. The central portion of the steam box or chamber is depressed, forming a basin or tank which holds water used in washing the fruit or vegetables being treated. The ends of the box are apertured to provide for the admission and removal of the product, and these apertures are closed by means of flaps to prevent, as far as possible, the escape of steam. The bottom or floor of the box serves as a guide or support for a conveyer chain which is maintained in contact with such floor by the weight of the product, or other suitable means which may be provided within the scope of my invention.

In the practice of my process, cages or baskets of perforated or foraminous material are filled with the vegetables or fruit, preferably in the field, or at the point of delivery to the factory, so that the fruit may be handled as little as possible. These cages are placed on the conveyer in front of the steam box and carried by the conveyer, passing first through the live steam, then downward through the hot water, up and forward to the front of the box where they may be again treated with live steam or heated air. From this point, the cage is moved out of the chamber and is removed from the conveyer. The fruit or vegetables are then taken from the baskets, peeled and placed immediately in cans and sealed.

By treating the product with steam before immersing it, I shorten the process of washing, as the dirt and foreign matter are loosened by the steam during the first scalding much more quickly than they would be in a bath of hot water. Also, in this way, I scald the surface so that the skin may be removed without cooking the interior of the fruit or vegetables, and thus I retain the natural flavor. Also, as the fruit is not internally cooked, it retains more of its original consistency, form and color, and is, therefore, more attractive. Treating the fruit in baskets, as shown, aids in this result, as the necessary handling is reduced to a minimum.

The accompanying drawing illustrates a machine by means of which my process may be carried out.

Figure 1 is a longitudinal, vertical section of the machine. Fig. 2 is a top plan.

In the machine as shown there is a frame 1 which supports a steam box 2 and a conveyer 3. The chamber is elongated in the direction of the traverse of the conveyer and apertured at its ends so that the upper half of the conveyer which is in the form of two horizontal chain belts passes through the chamber, and the conveyer is sufficiently loose so that when loaded it rests on the floor or bottom wall of the chamber. The latter is depressed centrally at 4 to form a tank to be filled with water and at the ends of the chamber beyond the tank 4 are perforated steam pipes 5 at the rear in the steam chamber 15, and, if desired, there may be also similar pipes 6 at the front in the steam chamber 16. The apertures 7 at the front and rear of the chamber are closed by means of curtains 8 to allow the passage of the product and, at the same time, to prevent the escape of steam. The parallel chains 9 which form the conveyer 3 are connected by means of transverse spaced bars 10 between which are placed cages or baskets 11 constructed of perforated or foraminous material to receive the fruit or vegetables to be treated and to allow the passage of the steam and water into contact with the product. The conveyer is driven in the direction of the arrows by means of suitable gears 12 and 13, so that the cages or baskets are moved from front to rear of the machine as described.

The application of steam, which is preferably at a pressure of eighty (80) pounds in the boiler, will give a temperature in the steam box of between 275° and 300° F. This is high enough to produce in about ten seconds a change in the structure of the skin sufficient to loosen it and permit it to be removed. The steam will also loosen the dirt, so that when the fruit is passed into the water bath for ten seconds, the dirt will fall off. The water is of much lower temperature than the steam and will not cook the fruit to any material extent. The passage of the fruit through the second steam bath, i. e., when it emerges from the water, will serve to scald it a little more and, what is more important, to dry it, so that when removed from the scalder it will be not only thoroughly scalded but practically dry. The scalding, having been done very rapidly, will have penetrated but a very short distance into the fruit, scarcely farther than the under side of the skin. If very exact scalding is desired, air may be substituted for the steam in the rear chamber for drying, and for this purpose the front and rear chambers may be separated by a curtain 17, or otherwise, and the temperature of the air may be regulated so as never to subject the fruit, after it leaves the first steam bath, to a temperature as high as the live steam.

What I claim and desire to secure by Letters Patent is:

The method of treating vegetables for canning which consists in subjecting them to the action of live steam, washing and then treating them with drying fluid.

Signed by me this 10th day of November 1909.

GEORGE E. WRIGHT.

Witnesses:
 EDWARD L. BASH,
 L. RALPH WARNKEN.